Dec. 13, 1932.     R. C. OSTERSTROM     1,891,107
METHOD OF POLYMERIZING HYDROCARBON OILS
Filed Nov. 6, 1929
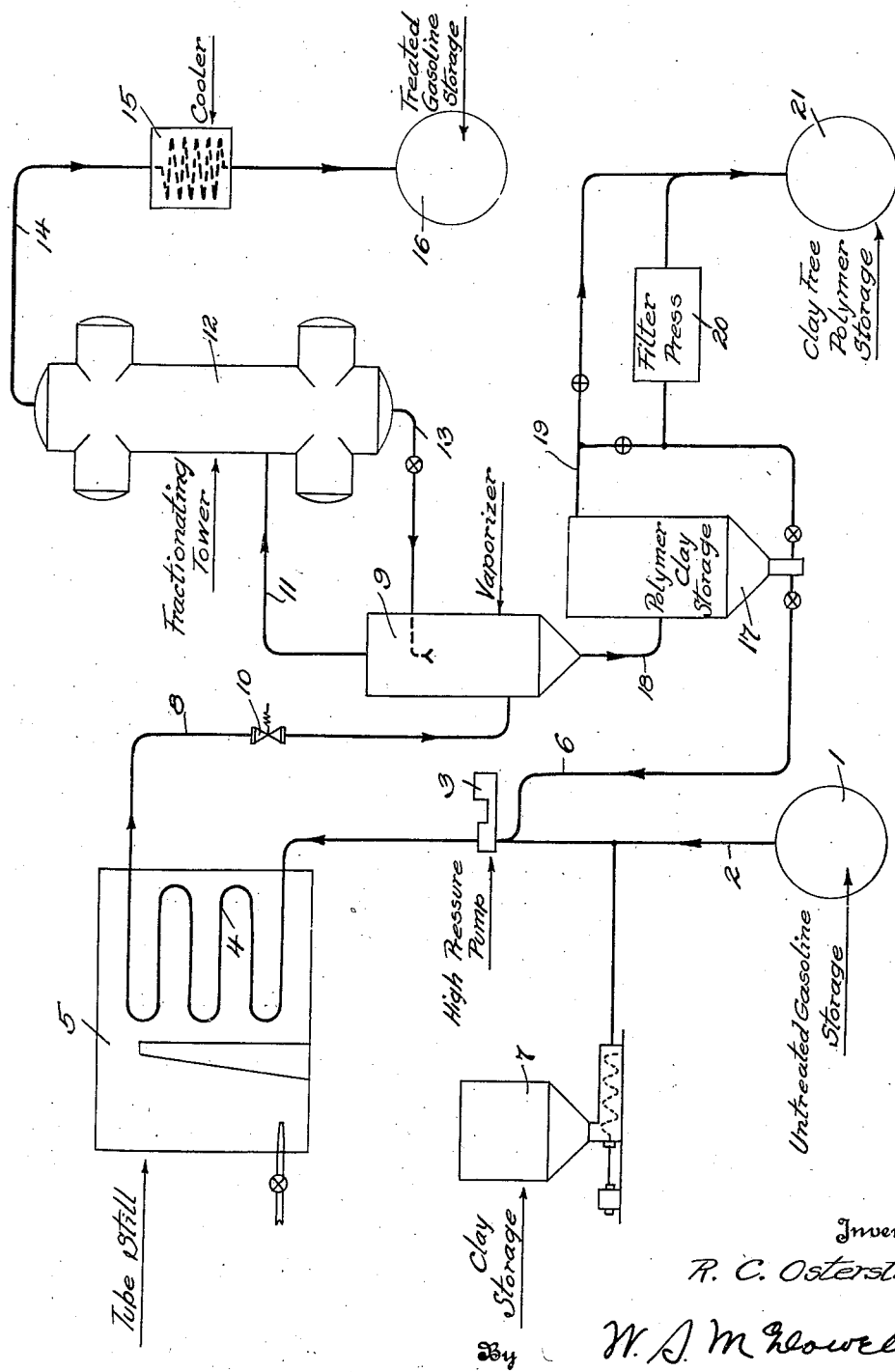
Inventor
R. C. Osterstrom
By W. A. McDowell
Attorney Patented Dec. 13, 1932

1,891,107

UNITED STATES PATENT OFFICE

RUDOLPH C. OSTERSTROM, OF CHICAGO, ILLINOIS, ASSIGNOR TO THE PURE OIL COMPANY, OF CHICAGO, ILLINOIS, A CORPORATION OF OHIO

METHOD OF POLYMERIZING HYDROCARBON OILS

Application filed November 6, 1929. Serial No. 405,251.

This invention relates to the art of refining hydrocarbon oils and has specific reference to provide an improved method for treating hydrocarbon distillates which contain a high percentage of diolefines or unsaturated constituents. Hydrocarbon distillates obtained from cracking systems, particularly high temperature cracking systems, contain ordinarily a very high percentage of undesirable constituents in the form of unsaturated compounds. These compounds, if permitted to remain in the distillate, form gum-like bodies which interfere with the usefulness of the oils as commercial motor fuels, and in addition discolor the oils. It is therefore necessary to treat the oils in order to remove these gum producing compounds.

In accordance with the present invention this object is attained by vaporizing the cracked distillate and by passing the same in a continuous moving stream through a heating still in the presence of a catalyst such as fuller's earth, whereby the oil when vaporized and under super-atmospheric pressures and in the presence of the catalyst is subjected to reactions of such character as to polymerize the diolefines present therein, whereby when the vapors are subsequently discharged under reduced pressure into a flash chamber there takes place a separation of the lighter desired products from the heavier, clay-containing polymerized products, the lighter products being separately removed, condensed and stored as commercial motor fuels.

It is another object of the invention to effect the recirculation of the polymer-clay fraction obtained from the bottom of the flash chamber through the polymerizing zone of the system, in order that the clay-polymer fraction may be reused as a catalyst in promoting further polymerization reactions.

It is an outstanding feature of the invention, therefore, to provide in a treating system of this character for the cyclic circulation of a catalyst through the system, to the end of rendering the system more economical and efficient in its operation, and at the same time to provide for the carrying out of the polymerization reactions to a desired degree.

For a further understanding of the invention reference is to be had to the following description and the accompanying drawing wherein is illustrated diagrammatically the steps and apparatus employed in carrying the present invention into practical effect.

In the drawing the numeral 1 designates a tank adapted for the reception of an untreated hydrocarbon distillate obtained, for example, from a cracking still and which distillates usually contain unsaturated compounds characterized by a high percentage of diolefines. Leading from the tank 1 is a pipe line 2 in which is located a high pressure pump 3 by which the oil under treatment is forced through the coil 4 of the vaporizing still 5. Entering the inlet side of the pump 3 is a pipe line 6 through which is passed or drawn a catalyst which in this instance consists of what may be termed an oil polymer-clay mud and which consists of a fluid mixture of fuller's earth and liquid oil containing a high percentage of polymers obtained by the cyclic operation of the system. Also connected with the pipe line 6 is a clay feeding unit 7 which is under ready control for the purpose of regulating the input of fresh fuller's earth into the system as required. The amount of fresh clay, however, introduced into the system is much less than that in other analogous systems wherein there is no recirculation of the clay provided.

Within the tube still 5 the distillate obtained from the tank 1 and also the catalyst are subjected to vaporizing temperatures of, for example, 650° F. to 700° F. and usually to super-atmospheric pressures in excess of 200 pounds. The oils in passing through the coil 4 of the still are permitted to vaporize since the pressures employed are not sufficiently high to prevent such vaporization with the temperatures utilized, and while the oil is in the vaporized state it reacts freely with the catalyst consisting of the finely divided fuller's earth and the oil polymers to effect polymerization of the undesirable compounds present therein, chiefly the diolefines. If desired, super-heated steam may be introduced into the oils as the latter enter the coil 4 to secure some degree of hydrogenation in the tube still in order to promote the formation of hydrocarbons suitable for use as motor fuels and to minimize the formation of the polymer fractions.

From the pipe still 5 the treated vapors pass by way of a pipe line 8 to a flash chamber or vaporizer 9. The line 8 contains a pressure relief valve 10 so that as the vapors enter the chamber 9 they are permitted to freely expand in order that there may take place an effective separation of the heavy clay-containing polymerized compounds as liquids or fluids from the desired low boiling compounds. The latter remain in the vapor phase and pass overhead from the vaporizer to a very large extent free from the higher boiling polymers, by way of a pipe line 11 into a fractionating tower 12. In this tower the vapors are subjected to a standard fractionating operation in order to remove from the vapors all entrained high boiling compounds. These high boiling compounds collect as a liquid in the bottom of the fractionating tower and may be returned to the top of the vaporizer by way of the pipe line 13 where they are employed to scrub the vapors passing upwardly through the vaporizer. A pipe line 14 leads from the top of the fractionating tower to a condenser 15 and thence to a storage tank 16 which receives the polymer-free distillate or treated gasoline.

One of the outstanding features of the present invention resides in collecting the liquid polymers and clay in the bottom of the vaporizer and then passing this mixture into a storage tank 17 by the employment of the pipe line 18. The bottom of the tank 17 connects with the pipe line 6 and is suitably valved in order to regulate the return of the clay-polymer mixture to the inlet side of the pump 3. The use of fuller's earth as a polymerizing agent or catalyst is well understood by the industry, but, so far as I am aware, such material has never been employed heretofore in a ring system of circulation, nor has the clay been employed in combination with the polymer products of the system.

The excess polymer and clay material which accumulates in the tank 17 is removed by way of the pipe lines 19 and is passed through a filter press 20 in order to effect the separation of the clay or fuller's earth from the liquid oils, the clay-free liquid oils are then transferred to a storage tank 21.

A system as above described has the advantage over prior systems of providing for thorough polymerization reactions to secure a desired end product which upon analysis will disclose a low or negligible gum content and of desired color, and especially the invention described is an improvement upon earlier systems by the provision of the step for effecting ring-like circulation of the catalyst which may consist of either finely divided fuller's earth, or a combination of the fuller's earth and the polymerized products. The latter have been found to be quite desirable in that they permit the catalyst to be introduced into the inlet side of the still pump in the form of a liquid and insure even distribution of the catalyst throughout all portions of the petroleum distillate undergoing treatment. Further, the system is an advantage in reducing the quantity of clay necessary to effect a given degree of polymerization of the products undergoing treatment. Instead of eliminating the clay from the system at the end of each complete operation, I have provided for its reuse or recirculation. Heretofore the clay has been removed at the end of each operation and dried and burned to restore its effectiveness as a catalyst. I have found, however, that by combining the clay with the liquid polymers and the solvent gasoline such burning or rejuvenation of the clay is not required, and this discovery has made the present invention distinctly economical over the earlier and so-called "once through" systems of polymerization.

What is claimed is:

1. The method of decolorizing and degumming cracked petroleum distillates which contain a high proportion of unsaturated compounds and gum-forming constituents comprising: adding a catalyst of the nature of fuller's earth and capable of polymerizing gum-forming constituents to a flowing stream of cracked distillate containing such gum-forming constituents, subjecting the mixture of distillate and catalyst to an elevated temperature and to a superatmospheric pressure whereby to substantially vaporize the distillate without cracking the same, then reducing the pressure on said mixture to separate the vaporized distillate from the catalyst and the gum-forming constituents produced by the heating step, and returning a portion, at least, of the gum-forming constituents and said catalyst to the heating stage for repassage through said stage with said distillates.

2. The method of decolorizing and degumming cracked petroleum oils containing gum-forming constituents in a high proportion of unsaturated compounds comprising: adding a solid finely divided polymerizing catalyst adapted to assist in the removal of gum-forming constituents to a flowing stream of oil, subjecting the flowing stream of said mixture to superatmospheric pressure and temperature to superatmospheric conditions, releasing said superatmospheric pressure, discharging the mixture into a vaporizing and fractionating zone, separately discharging treated oil vapors and catalyst together with gummy constituents from said zone, and returning a portion of the mixture of gummy constituents and catalyst to the heating stage for repassage through said stage with the oil flowing therethrough.

3. The method of decolorizing and degumming cracked petroleum distillates containing gum-forming constituents in a high proportion of unsaturated compounds, comprising adding in regulated quantities a catalyst in the nature of fuller's earth to a flowing stream of such oils, passing the flowing stream of said mixture through a heating zone wherein said mixture is subjected to superatmospheric pressure and temperature conditions, whereby to substantially vaporize said mixture and polymerize the undesirable constituents contained therein, removing the mixture from the heating stage and reducing the pressure thereon whereby to separate as vapors the lighter treated oils from the heavier undesirable polymerized oils and the catalyst, and returning a portion at least of the polymerized oils and catalyst to the heating stage for repassage therethrough with said oils.

4. In a process for removing gum-forming and color-imparting bodies from cracked petroleum distillates, the steps which comprise producing a mixture of such a distillate and a solid adsorptive catalyst, continuously passing said mixture through an externally heated elongated polymerizing zone of restricted cross-sectional area, heating the mixture during its passage through said zone to vaporizing but non-cracking temperatures while the mixture is maintained under superatmospheric pressures, passing the mixture from said polymerizing zone under reduced pressure into a separating zone, removing as vapors from said separating zone the light treated oils, removing at another point from said separating zone the heavy polymerized oils containing the undesirable constituents and said catalyst, and returning a portion at least of the polymerized oils together with the catalyst to the inlet side of the polymerizing zone for repassage through said latter zone in unison with fresh oils undergoing initial treatment therein.

In testimony whereof I affix my signature.

RUDOLPH C. OSTERSTROM.